United States Patent [19]
Thompson

[11] Patent Number: 6,050,647
[45] Date of Patent: Apr. 18, 2000

[54] SEAT BELT CLIP

[76] Inventor: David A. Thompson, 231 Ranger Dr., Hereford, Tex. 79045

[21] Appl. No.: 09/195,952

[22] Filed: Nov. 19, 1998

[51] Int. Cl.[7] ............................ A47D 15/00; A62B 35/00; B60R 21/00

[52] U.S. Cl. ........................ 297/468; 297/483; 297/484; 24/499; 24/507; 24/510; 24/556

[58] Field of Search ...................... 297/468, 483, 297/484; 24/556, 499, 633, 507, 510

[56] References Cited

U.S. PATENT DOCUMENTS

| | | | |
|---|---|---|---|
| 433,297 | 7/1890 | Mallett | 24/510 |
| 1,195,874 | 8/1916 | Thurston | 24/510 X |
| 1,357,151 | 10/1920 | Dalhaus | 24/507 |
| 1,992,023 | 2/1935 | Cahn | 24/510 X |
| 2,464,739 | 3/1949 | Solomon et al. | 24/499 X |
| 2,856,660 | 10/1958 | Twohig | 24/507 X |
| 2,867,882 | 1/1959 | Moore | 24/510 X |
| 2,979,060 | 4/1961 | Reiner | 24/507 X |
| 3,091,828 | 6/1963 | Soltis | 24/507 X |
| 3,362,052 | 1/1968 | Uchida | 24/510 |
| 4,722,120 | 2/1988 | Lu | 24/499 X |
| 4,796,919 | 1/1989 | Linden | 297/483 X |
| 5,201,099 | 4/1993 | Campbell | 297/483 X |
| 5,350,196 | 9/1994 | Atkins | 297/483 X |
| 5,495,646 | 3/1996 | Scrutchfield et al. | 24/499 X |
| 5,549,127 | 8/1996 | Chang | 24/510 X |
| 5,692,806 | 12/1997 | Jones | 297/483 |
| 5,803,096 | 9/1998 | Lee | 24/510 |
| 5,842,482 | 12/1998 | Potut | 24/510 X |
| 5,862,815 | 1/1999 | Murphy et al. | 24/556 X |

*Primary Examiner*—Peter M. Cuomo
*Assistant Examiner*—Rodney B. White

[57] ABSTRACT

A seat belt clip for preventing the shoulder strap portion of a seat belt from being pulled too tight on the chest of a user by the seat belt retracting mechanism. The seat belt clip includes first and second arms each having inner and outer faces, a tab portion, an elongate cross portion coupled to the tab portion of the respective arm and a plurality of spaced apart elongate fingers outwardly extending from the cross portion of the respective arm. The inner faces of the first and second arms face. The first and second arms are pivotally coupled together at a fulcrum positioned between the tab portions of the arms adjacent the cross portions of the arms. The fingers of the first arm and the fingers of the second arm are biased towards one another.

11 Claims, 2 Drawing Sheets

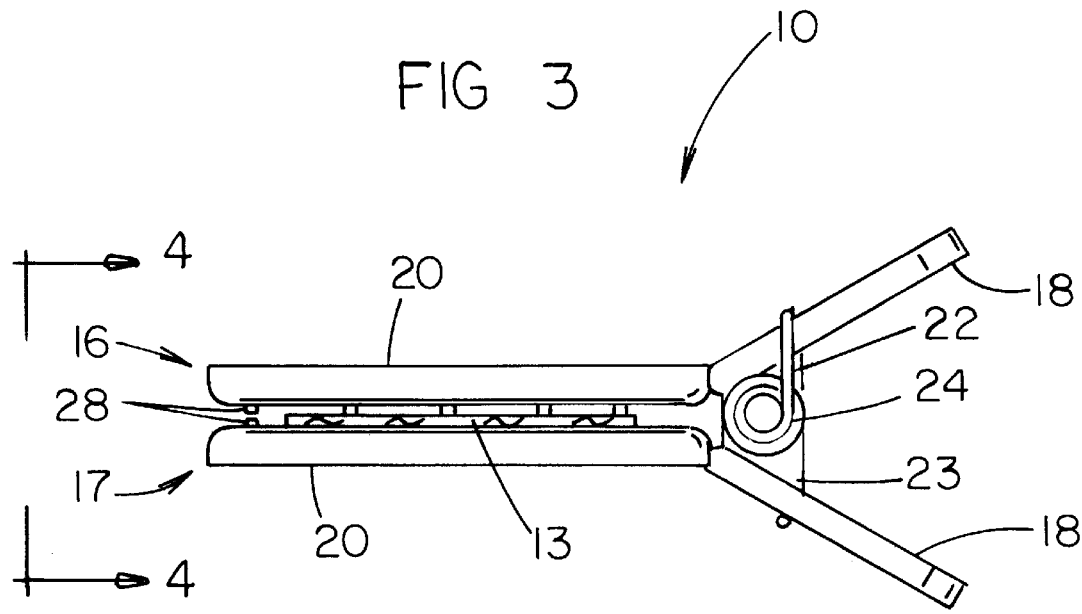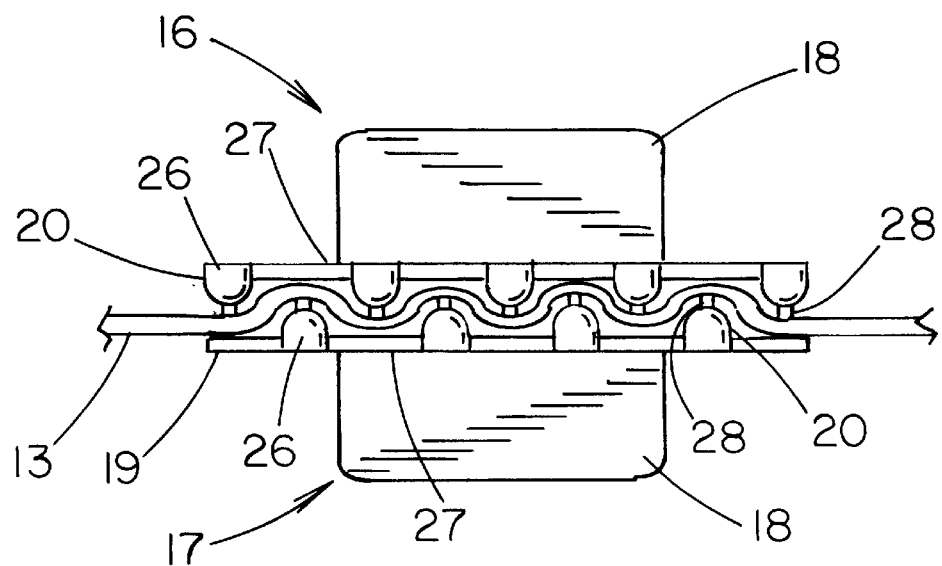

SEAT BELT CLIP

BACKGROUND OF THE INVENTION

1. Field of the Invention

The present invention relates to seat belt clips and more particularly pertains to a new seat belt clip for preventing the shoulder strap portion of a seat belt from being pulled too tight on the chest of a user by the seat belt retracting mechanism.

2. Description of the Prior Art

The use of seat belt clips is known in the prior art. More specifically, seat belt clips heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,648,625 by Lynch; U.S. Pat. No. 5,265,910 by Barr et al.; U.S. Pat. No. 5,340,198 by Murphy et al.; U.S. Pat. No. 4,452,470 by Doty; U.S. Pat. No. 3,871,470 by Schwanz et al; and U.S. Pat. No. Des. 381,119 by Chang.

While these devices fulfill their respective, particular objectives and requirements, the aforementioned patents do not disclose a new seat belt clip. The inventive device includes first and second arms each having inner and outer faces, a tab portion, an elongate cross portion coupled to the tab portion of the respective arm and a plurality of spaced apart elongate fingers outwardly extending from the cross portion of the respective arm. The inner faces of the first and second arms face. The first and second arms are pivotally coupled together at a fulcrum positioned between the tab portions of the arms adjacent the cross portions of the arms. The fingers of the first arm and the fingers of the second arm are biased towards one another.

In these respects, the seat belt clip according to the present invention substantially departs from the conventional concepts and designs of the prior art, and in so doing provides an apparatus primarily developed for the purpose of preventing the shoulder strap portion of a seat belt from being pulled too tight on the chest of a user by the seat belt retracting mechanism.

SUMMARY OF THE INVENTION

In view of the foregoing disadvantages inherent in the known types of seat belt clips now present in the prior art, the present invention provides a new seat belt clip construction wherein the same can be utilized for preventing the shoulder strap portion of a seat belt from being pulled too tight on the chest of a user by the seat belt retracting mechanism.

The general purpose of the present invention, which will be described subsequently in greater detail, is to provide a new seat belt clip apparatus and method which has many of the advantages of the seat belt clips mentioned heretofore and many novel features that result in a new seat belt clip which is not anticipated, rendered obvious, suggested, or even implied by any of the prior art seat belt clips, either alone or in any combination thereof.

To attain this, the present invention generally comprises first and second arms each having inner and outer faces, a tab portion, an elongate cross portion coupled to the tab portion of the respective arm and a plurality of spaced apart elongate fingers outwardly extending from the cross portion of the respective arm. The inner faces of the first and second arms face. The first and second arms are pivotally coupled together at a fulcrum positioned between the tab portions of the arms adjacent the cross portions of the arms. The fingers of the first arm and the fingers of the second arm are biased towards one another.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new seat belt clip apparatus and method which has many of the advantages of the seat belt clips mentioned heretofore and many novel features that result in a new seat belt clip which is not anticipated, rendered obvious, suggested, or even implied by any of the prior art seat belt clips, either alone or in any combination thereof.

It is another object of the present invention to provide a new seat belt clip which may be easily and efficiently manufactured and marketed.

It is a further object of the present invention to provide a new seat belt clip which is of a durable and reliable construction.

An even further object of the present invention is to provide a new seat belt clip which is susceptible of a low cost of manufacture with regard to both materials and labor, and which accordingly is then susceptible of low prices of sale to the consuming public, thereby making such seat belt clip economically available to the buying public.

Still yet another object of the present invention is to provide a new seat belt clip which provides in the apparatuses and methods of the prior art some of the advantages thereof, while simultaneously overcoming some of the disadvantages normally associated therewith.

Still another object of the present invention is to provide a new seat belt clip for preventing the shoulder strap portion of a seat belt from being pulled too tight on the chest of a user by the seat belt retracting mechanism.

Yet another object of the present invention is to provide a new seat belt clip which includes first and second arms each having inner and outer faces, a tab portion, an elongate cross portion coupled to the tab portion of the respective arm and a plurality of spaced apart elongate fingers outwardly extending from the cross portion of the respective arm. The inner faces of the first and second arms face. The first and second arms are pivotally coupled together at a fulcrum positioned between the tab portions of the arms adjacent the cross portions of the arms. The fingers of the first arm and the fingers of the second arm are biased towards one another.

Still yet another object of the present invention is to provide a new seat belt clip that eliminates the annoyance of a seat belt constantly pulling on the shoulder and chest of a user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic side view of the present invention.

FIG. 4 is a schematic end view of the present invention taken from the vantage of line 4—4 of FIG. 3.

DESCRIPTION OF THE PREFERRED EMBODIMENT

Figure 1:
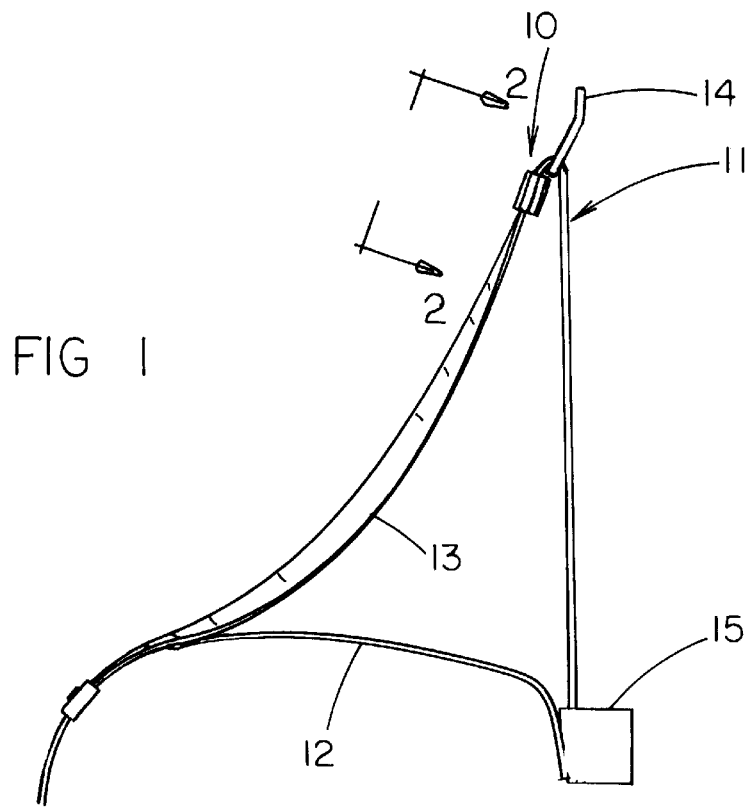
FIG. 1 is a schematic side perspective view of a new seat belt clip in use on a seat belt according to the present invention.

With reference now to the drawings, and in particular to FIGS. 1 through 4 thereof, a new seat belt clip embodying the principles and concepts of the present invention and generally designated by the reference numeral 10 will be described.

As best illustrated in FIGS. 1 through 4, the seat belt clip 10 generally comprises first and second arms each having inner and outer faces, a tab portion, an elongate cross portion coupled to the tab portion of the respective arm and a plurality of spaced apart elongate fingers outwardly extending from the cross portion of the respective arm. The inner faces of the first and second arms face. The first and second arms are pivotally coupled together at a fulcrum positioned between the tab portions of the arms adjacent the cross portions of the arms. The fingers of the first arm and the fingers of the second arm are biased towards one another.

In closer detail, the seat belt clip 10 is designed for use with a seat belt 11 of a vehicle having a waist strap portion 12 and a shoulder strap portion 13. The shoulder strap portion is looped through and depends from an upper hanger 14. The shoulder strap has an end outwardly extending from the back side of the upper hanger connected to a retracting assembly 15 for retracting the shoulder strap therein to shorten the effective length of the shoulder strap.

Specifically, the clip includes first and second arms 16,17 each having inner and outer faces, a tab portion 18, an elongate cross portion 19 coupled to the tab portion of the respective arm and a plurality of spaced apart elongate fingers 20 outwardly extending from the cross portion of the respective arm. The fingers of each arm are preferably extended substantially perpendicular to the associated cross portion of the respective arm. The fingers of each arm is spaced apart from one another preferably at generally equal intervals along the length of the associated cross portion of the respective arm.

Preferably, as illustrated in FIG. 3, the fingers and cross portion of each arm lie in a common plane while the tab portion of each arm lies in plane extending at an obtuse angle to the plane of the associated fingers and cross portion of the respective arm. The obtuse angles formed between the planes of the tab portion and the fingers and cross portions of the arms are preferably about equal to one another. In a preferred embodiment, the obtuse angles are each between about 130 degrees and about 160 degrees. Ideally, the obtuse angles are each about 145 degrees.

Figure 2:
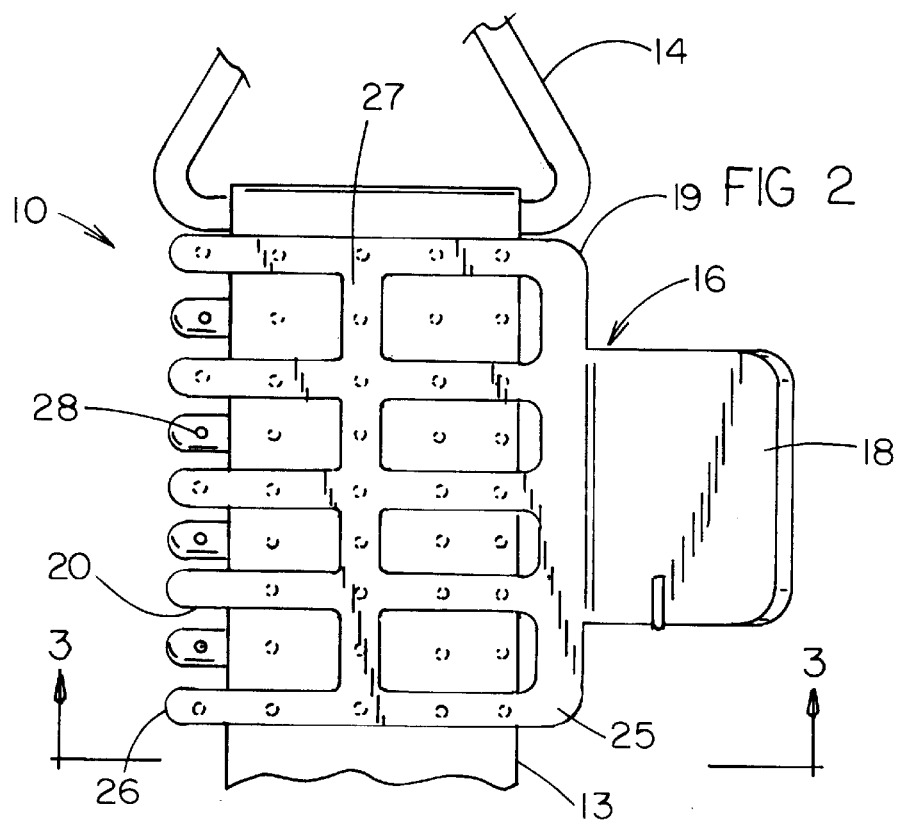
FIG. 2 is a schematic plan view of the present invention taken from the vantage of line 2—2 of FIG. 1.

The first and second arms are pivotally coupled together at a fulcrum 21 so that the inner faces of the first and second arms face one another. The fulcrum is positioned between the tab portions of the arms adjacent the cross portions of the arms. In use, the shoulder strap is positioned between the fingers of the first and second arms such that the inner faces of the first and second arms face opposite sides of the shoulder strap. With particular reference to FIGS. 1 and 2, the clip is positioned on the shoulder strap such that the upper hanger is positioned between the clip and the retracting mechanism. The fingers of the first arm and the fingers of the second arm are biased towards one another such that the clip is held at a fixed position on the shoulder strap between the fingers of the arms.

Preferably, the fulcrum comprises a pair of pivotally connected pivot saddles 22,23 and a coiled spring 24. One of the pivot saddles is coupled to the inner face of the first arm on the tab portion of the first arm adjacent the cross portion of the first arm. The other pivot saddle is coupled to the inner face of the second arm on the tab portion of the second arm adjacent the cross portion of the second arm. The spring is interposed between the pivot saddles so that the spring biases the fingers of the first arm and the fingers of the second arm towards one another.

The fingers of the first and second arms each have a root 25 positioned adjacent the associated cross portion of the respective arm and each terminates at a tip 26 distal the root of the respective finger. Each of the fingers of the arms has a length defined between the root and tip of the respective finger. Preferably, lengths of the fingers of the arms are equal to one another. As best shown in FIGS. 2 and 4, the fingers of the first arm are aligned in a staggered arrangement with the fingers of the second arm such that a finger of the second arm in positioned between each adjacent pair of fingers of the first arm. Preferably, the plurality of fingers of the first arm comprises an odd number of fingers and the plurality of fingers of the second arm comprise an even number of fingers. Ideally, the even number of fingers of the second arm is one finger less than the odd number of fingers of the first arm such that the staggered arrangement in bounded at either end by a finger of the first arm.

Preferably, the first and second arms each have an elongate reinforcing strip 27 coupled to each of the fingers of the respective arm. Each of the reinforcing strips is positioned at a midpoint on each of the associated fingers of the respective arm generally equidistant from the root and tip of each associated finger. The reinforcing strips of the arms each are spaced apart from the associated cross portion of the respective arm so that the reinforcing strips of the arms each are extended substantially parallel to the associated cross portion of the respective arm.

In a preferred embodiment, each of the fingers of the arms has a plurality of spaced apart resiliently deformable nubs 28 outwardly extending from the inner face of the respective arm member. The nubs of each finger are preferably arranged in a row extending between the root and tip of the respective finger and spaced apart at generally equal intervals in the row. Even more preferably, a spaced apart plurality of the resiliently deformable nubs are also outwardly extended from the inner face of each arm from each of the reinforcing strips. The nubs of each reinforcing strip are also ideally spaced apart at generally equal intervals along the respective reinforcing strip. In use, the nubs frictionally hold the arms of the clip in the fixed position on the shoulder strap so that the clip does not slid along the length of the shoulder strap.

Each of the arms has a width defined between opposite ends of the respective cross portion. As mentioned earlier, each of the fingers has a length defined between the root and tip of the respective finger. Each of the tab portions has a length defined from the associated cross portion. The width of each arm is preferably greater than the length of each of the fingers of the respective arm. The length of each finger is preferably greater than length of the associated tab portion. In an ideal illustrative embodiment, the width of each arm is about 5 inches, the length of each finger is about 2 inches, and the length of each tab portion is about 1 inch.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A seat belt clip, comprising:
   first and second arms each having inner and outer faces, a tab portion, an elongate cross portion coupled to said tab portion and a plurality of spaced apart elongate fingers outwardly extending from said cross portion;
   said inner faces of said first and second arms facing one another;
   said first and second arms being pivotally coupled together at a fulcrum, said fulcrum being positioned between said tab portions of said arms adjacent said cross portions of said arms; and
   said fingers of said first arm and said fingers of said second arm being biased towards one another; and
   said first and second arms each having an elongate reinforcing strip coupled to each of said fingers of each arm, each of said reinforcing strips being positioned at a midpoint on each of said fingers of each arm generally equidistant from a root and a tip of each associated finger.

2. The seat belt clip of claim 1, wherein said fingers of each arm are extended substantially perpendicular to said cross portion of each arm.

3. The seat belt clip of claim 2, wherein said fingers of each arm being spaced apart from one another at generally equal intervals along said cross portion of each arm.

4. The seat belt clip of claim 1, wherein said fingers and said cross portion of each arm lying in a common plane, said tab portion of each arm lying in a plane extending at an obtuse angle to the plane of said fingers and said cross portion of each arm.

5. The seat belt clip of claim 4, wherein said obtuse angles formed between the planes of the tab portion of each arm and the fingers and cross portions of said arms are about equal to one another.

6. The seat belt clip of claim 4, wherein said obtuse angles are each between about 130 degrees and about 160 degrees.

7. The seat belt clip of claim 1, wherein said fulcrum comprises a pair of pivot saddles and a spring, one of said pivot saddles being coupled to said inner face of said first arm on said tab portion of said first arm adjacent said cross portion of said first arm, the other of said pivot saddles being coupled to said inner face of said second arm on said tab portion of said second arm adjacent said cross portion of said second arm, said spring being interposed between said pivot saddles, said spring biasing said fingers of said first arm and said fingers of said second arm towards one another.

8. The seat belt clip of claim 1, wherein said fingers of said first arm are aligned in a staggered arrangement with said fingers of said second arm such that a finger of said second arm in positioned between each adjacent pair of fingers of said first arm.

9. The seat belt clip of claim 8, wherein said plurality of fingers of said first arm comprises an odd number of fingers, wherein said plurality of fingers of said second arm comprise an even number of fingers, wherein said even number of fingers of said second arm is one finger less than said odd number of fingers of said first arm.

10. The seat belt clip of claim 1, wherein each of said fingers of said arms has a plurality of spaced apart resiliently deformable nubs outwardly extending from the inner face of each arm.

11. A clip system, comprising:
   a seat belt having a shoulder strap portion being looped through and depending from an upper hanger, said shoulder strap having an end connected to a retracting assembly for retracting the shoulder strap therein to shorten an effective length of the shoulder strap;
   a clip comprising:
      first and second arms each having inner and outer faces, a tab portion, an elongate cross portion coupled to said tab portion and a plurality of spaced apart elongate fingers outwardly extending from said cross portion;
      said fingers of each arm being extended substantially perpendicular to said cross portion of each arm;
      said fingers of each arm being spaced apart from one another at generally equal intervals along the associated cross portion of the respective arm;

said fingers and cross portion of each arm lying in a common plane, said tab portion of each arm lying in plane extending at an obtuse angle to the plane of said fingers and cross portion of each arm;

wherein said obtuse angles formed between the planes of the tab portion and the fingers and cross portions of said arms are about equal to one another;

wherein said obtuse angles are each between about 130 degrees and about 160 degrees;

said inner faces of said first and second arms facing one another;

said first and second arms being pivotally coupled together at a fulcrum, said fulcrum being positioned between said tab portions of said arms adjacent said cross portions of said arms;

said shoulder strap being positioned between said fingers of said first and second arms such that said inner faces of said first and second arms face said shoulder strap;

said clip being positioned on said shoulder strap such that said upper hanger is positioned between said clip and said retracting mechanism;

said fingers of said first arm and said fingers of said second arm being biased towards one another such that said clip is held at a position on said shoulder strap between said fingers of said arms;

wherein said fulcrum comprises a pair of pivot saddles and a spring;

one of said pivot saddles being coupled to said inner face of said first arm on said tab portion of said first arm adjacent said cross portion of said first arm, the other of said pivot saddles being coupled to said inner face of said second arm on said tab portion of said second arm adjacent said cross portion of said second arm;

said spring being interposed between said pivot saddles, said spring biasing said fingers of said first arm and said fingers of said second arm towards one another;

said fingers of said first and second arms each having a root positioned adjacent said cross portion of each arm and terminating at a tip distal the root of said finger;

each of said fingers of said arms having a length defined between said root and tip of the respective finger, wherein lengths of said fingers of said arms are equal to one another;

said fingers of said first arm being aligned in a staggered arrangement with said fingers of said second arm such that a finger of said second arm in positioned between each adjacent pair of fingers of said first arm;

wherein said plurality of fingers of said first arm comprises an odd number of fingers, wherein said plurality of fingers of said second arm comprise an even number of fingers, wherein said even number of fingers of said second arm is one finger less than said odd number of fingers of said first arm;

said first and second arms each having an elongate reinforcing strip coupled to each of said fingers of each arm, each of said reinforcing strips being positioned at a midpoint on each of said fingers of each arm generally equidistant from said root and tip of each associated finger;

said reinforcing strips of said arms each being spaced apart from said cross portion of each arm, said reinforcing strips of said arms each being extended substantially parallel to said cross portion of each arm;

each of said fingers of said arms having a plurality of spaced apart resiliently deformable nubs outwardly extending from the inner face of each arm;

said nubs of each finger being arranged in a row extending between the root and tip of said finger and spaced apart at generally equal intervals in the row;

each of said reinforcing strips of said arms having a plurality of spaced apart resiliently deformable nubs outwardly extending from the inner face of each arm, said nubs of each reinforcing strip being spaced apart at generally equal intervals along each reinforcing strip; and said nubs frictionally holding said arms of said clip in said position on said shoulder strap.

\* \* \* \* \*